May 7, 1940.  W. O. WHITE  2,199,683

COVER FOR CONDUIT OUTLET BOXES

Filed March 31, 1939

INVENTOR.
Walter O. White
BY Bodell & Thompson
ATTORNEYS.

Patented May 7, 1940

2,199,683

UNITED STATES PATENT OFFICE 2,199,683

COVER FOR CONDUIT OUTLET BOXES

Walter O. White, Salina, N. Y., assignor to Crouse-Hinds Company, Syracuse, N. Y., a corporation of New York Application March 31, 1939, Serial No. 265,312

2 Claims. (Cl. 220—3.8)

This invention relates to covers for conduit outlet boxes and has for its object a particularly simple and efficient means self-contained with the cover and operable to secure the cover to the box.

The invention consists in the novel features and in the combinations and constructions hereinafter set forth and claimed.

In describing this invention, reference is had to the accompanying drawing in which like characters designate corresponding parts in all the views.

Figure 1:
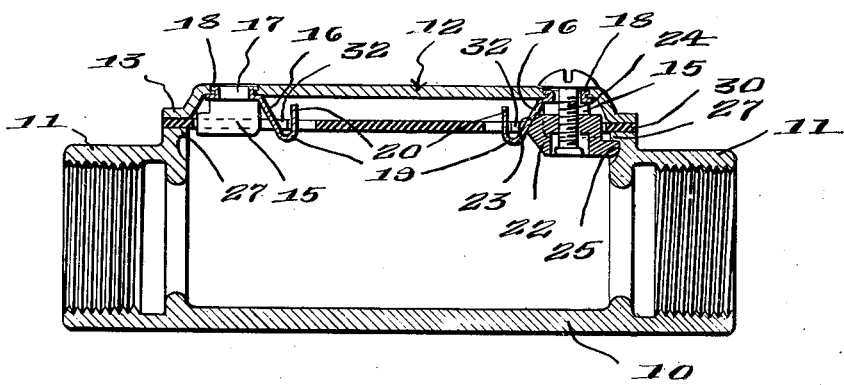
Figure 1 is a lengthwise, sectional view of a conduit outlet box and a cover therefor embodying my invention.
Figure 2:
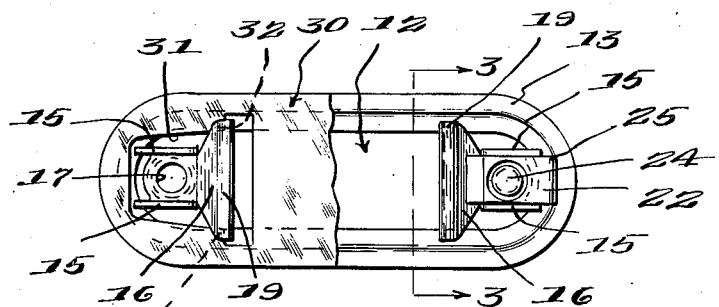
Figure 2 is a bottom plan view of the cover with parts removed from one of the fastening members and a portion of the sealing gasket removed.

The invention has to do particularly with covers for metallic outlet boxes of the conventional construction provided with an opening in one side through which access is obtained to the interior of the box for the purpose of installing the electrical conductors therein. The cover is of the general type shown in Patent No. 2,099,918 to D. B. Winter, November 23, 1937, wherein the cover is provided at each end with a fastening means operable from the outside of the cover to secure the cover to the box, and the invention further contemplates the use of a sealing gasket interposed between the cover and the box, and one of the features of this invention constitutes the interlock between the gasket and the fastening means, whereby the gasket is not readily dislocated from the cover previous to its application to the box.

In the embodiment shown, the conduit outlet box 10 is of conventional formation provided with an internally threaded hub 11 at each end to receive the conduits. The top side of the box is formed with a work opening substantially coextensive with the top of the box. The cover comprises a metallic plate 12 formed with a marginal flange 13 complemental to the margin about the opening in the box, and the cover is dished, whereby the plane of the flange 13 is offset from the plane of the main portion of the cover.

The fastening means consists generally of a pair of nuts or wedges which are operated by screws extending through the cover and which are cooperable with means secured to the under side of the cover to effect longitudinal movement of the wedges relative to the cover, whereby upon tightening of the screws the nuts are moved into engagement with the wall of the box.

The means for effecting the longitudinal movement of the nuts consists of a channel member having parallel side walls 15 and a rear wall 16. The bottom wall of the channel member is provided with an opening 17 and is formed with a tubular projection extending through a complemental hole in the cover and being swedged over as at 18 to secure the channel member to the under side of the cover.

Figure 3:
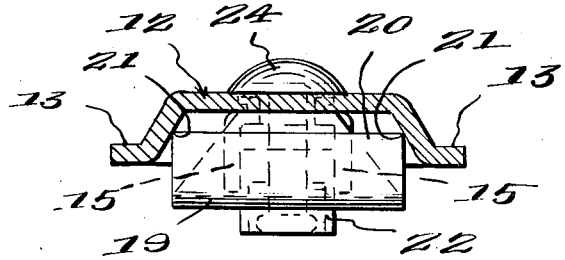
Figure 3 is an enlarged, sectional view taken on line 3—3, Figure 2.

The rear wall 16 is bent or folded to form a rib or roll 19 and a portion 20 extending toward the under side of the cover. The rib 19 and portion 20 extend transversely across the under side of the cover in spaced apart relationship thereto, with the ends of the portion 20 engaging the under side of the cover adjacent the marginal flange as at 21, Figure 3. The edges of the portion 20 are square and tend to bite into the under surface of the cover and thereby form a means of backing up or stiffening the inclined surface 16.

A nut 22 is arranged in each channel member, and the rear end of the nuts is formed with an inclined surface 23 complemental to the incline of wall 16, and the nut is threaded to receive a screw 24 extending through the cover and the bottom wall of the channel member. The opposite end of each nut is preferably formed with a projection 25. The arrangement is such that when the screw 24 is tightened and the nut 22 moved toward the bottom of the channel member, it is also caused to move laterally into engagement with the wall of the outlet box. As here shown, the end wall of the box is formed with a recess to provide a slight ledge 27 under which the projection 25 of the nut is moved. Thus the cover is fixedly secured to the box.

If desired, a sealing gasket 30 may be interposed between the cover and the box. The gasket is formed at each end with a recess 31 to receive the channel members and with inwardly extending projections 32 arranged between the walls 16, 20 of the channel member. Accordingly, the gasket is interlocked with the cover and is held from accidental displacement previous to the application of the cover to the box. The transversely extending portion 20 serves to stiffen the inclined wall 16 and also serves as a means for maintaining the channel member in proper alinement with the cover. The outer ends of the walls 15 serve to engage the end walls of the opening in the box to center the cover longitudinally of the opening, and the transversely extending portions engage the side walls of the opening in the box to center the cover transversely thereof.

The channel members are particularly economical in that they require a minimum amount of metal and are economical to manufacture inasmuch as they can be conveniently blanked and drawn in the conventional punch press.

What I claim is:

1. The combination of a conduit outlet box having an opening in one side thereof and a cover for said opening, said cover comprising a plate formed with a marginal flange complemental with the marginal surface about the opening in the box, a channel member secured to the under side of the cover adjacent each end thereof, each of said channel members having side walls and an inner rear wall depending below the plane of said marginal flange, said side walls extending lengthwise of the cover, and said rear wall being inclined from the bottom of the channel member toward the center of the cover and being folded to form a portion extending toward the under side of the cover, said folded portion extending transversely across the under side of the cover and engaging at its ends the sides of the marginal flange of the cover, the ends of said folded portion engaging the side walls of the opening in the box to center the cover transversely on the box, and the outer ends of the side walls of the channel members engaging the end walls of the box to center the cover longitudinally of the box, a nut arranged in each of said channel members, a screw extending through the cover and threading into said nut, the inner end of said nut being cooperable with said rear wall to move the outer end of the nut into engagement with the wall of the box upon tightening of the screw.

2. The combination of a conduit outlet box having an opening in one side thereof and a cover for said opening, said cover comprising a plate formed with a marginal flange complemental with the marginal surface about the opening in the box, a channel member secured to the under side of the cover adjacent each end thereof, each of said channel members having side walls and an inner rear wall depending below the plane of said marginal flange, said side walls extending lengthwise of the cover, and said rear wall being inclined from the bottom of the channel member toward the center of the cover and being folded to form a portion extending toward the under side of the cover, said folded portion extending transversely across the under side of the cover and engaging at its ends the sides of the marginal flange of the cover, the ends of said folded portion engaging the side walls of the opening in the box to center the cover transversely on the box, and the outer ends of the side walls of the channel members engaging the end walls of the box to center the cover longitudinally of the box, a gasket arranged on the marginal flange of the cover and being formed with projections extending inwardly from the sides thereof and being arranged in the ends of said folded portion to detachably interlock the gasket to the cover, a nut arranged in each of said channel members, a screw extending through the cover and threading into said nut, the inner end of said nut being cooperable with said rear wall to move the outer end of the nut into engagement with the wall of the box upon tightening of the screw.

WALTER O. WHITE.